(12) United States Patent
Fujii

(10) Patent No.: US 9,490,071 B2
(45) Date of Patent: Nov. 8, 2016

(54) MULTILAYER CAPACITOR, TAPING MULTILAYER CAPACITOR SERIES, AND MOUNTING STRUCTURE OF MULTILAYER CAPACITOR

(71) Applicant: Murata Manufacturing Co., Ltd., Nagaokakyo-shi, Kyoto-fu (JP)

(72) Inventor: Yasuo Fujii, Nagaokakyo (JP)

(73) Assignee: MURATA MANUFACTURING CO., LTD., Kyoto (JP)

( * ) Notice: Subject to any disclaimer, the term of this patent is extended or adjusted under 35 U.S.C. 154(b) by 101 days.

(21) Appl. No.: 14/148,992

(22) Filed: Jan. 7, 2014

(65) Prior Publication Data

US 2014/0211368 A1    Jul. 31, 2014

(30) Foreign Application Priority Data

Jan. 25, 2013   (JP) ................... 2013-011714
Nov. 6, 2013    (JP) ................... 2013-230162

(51) Int. Cl.
*H01G 4/30*     (2006.01)
*H01G 4/012*    (2006.01)
*H01G 4/12*     (2006.01)

(52) U.S. Cl.
CPC .............. *H01G 4/30* (2013.01); *H01G 4/012* (2013.01); *H01G 4/12* (2013.01)

(58) Field of Classification Search
CPC ........... H01G 4/12; H01G 4/30; H01G 4/012
See application file for complete search history.

(56) References Cited

U.S. PATENT DOCUMENTS

| 4,750,084 | A  | * | 6/1988  | Nikaidoh ............... H01G 4/30 29/25.42 |
| 6,057,634 | A  | * | 5/2000  | Yoshino ............... H03H 9/0514 310/345 |
| 2008/0100987 | A1 | * | 5/2008 | Togashi ................ H01G 4/005 361/301.4 |
| 2009/0002918 | A1 |   | 1/2009  | Kawasaki et al. |
| 2010/0157507 | A1 | * | 6/2010 | Matsumoto ............. H01G 4/30 361/306.3 |
| 2012/0300361 | A1 | * | 11/2012 | Togashi .................. H01G 4/30 361/301.4 |
| 2013/0050895 | A1 | * | 2/2013 | Tezuka ................... H01G 2/065 361/313 |

(Continued)

FOREIGN PATENT DOCUMENTS

FR    2916299 A1 *  11/2008  ............. H01G 2/065
JP    46-19234 Y1    7/1971

(Continued)

OTHER PUBLICATIONS

Machine translation of the description of JP11040456 published on Feb. 12, 1999.*

(Continued)

*Primary Examiner* — David M Sinclair
(74) *Attorney, Agent, or Firm* — Keating & Bennett, LLP

(57) ABSTRACT

A multilayer capacitor that achieves reduced acoustic noise includes a capacitor body including a capacitance generating portion, a first outer layer portion, and a second outer layer portion. First and second internal electrodes are provided in the capacitance generating portion. The first outer layer portion is located between the capacitance generating portion and a first principle surface. The second outer layer portion is located between the capacitance generating portion and a second principle surface. The second outer layer portion is thicker than the first outer layer portion. At least one of a concave portion and a convex portion is provided on the second principle surface.

16 Claims, 6 Drawing Sheets

(56) References Cited

U.S. PATENT DOCUMENTS

| | | | | |
|---|---|---|---|---|
| 2013/0319741 | A1* | 12/2013 | Ahn | H01G 4/30 174/260 |
| 2014/0218841 | A1* | 8/2014 | Ning | H01G 4/35 361/311 |
| 2014/0326493 | A1* | 11/2014 | Lee | H01G 4/01 174/260 |
| 2015/0016014 | A1* | 1/2015 | Park | H01G 2/065 361/301.4 |

FOREIGN PATENT DOCUMENTS

| | | | |
|---|---|---|---|
| JP | 61-295619 A | | 12/1986 |
| JP | 03163810 A | * | 7/1991 |
| JP | 06084687 A | * | 3/1994 |
| JP | 6-215978 A | | 8/1994 |
| JP | 08045777 A | * | 2/1996 |
| JP | 9-260184 A | | 10/1997 |
| JP | 10097942 A | * | 4/1998 |
| JP | 11040456 A | * | 2/1999 |
| JP | 2004-153098 A | | 5/2004 |
| JP | 2009-071106 A | | 4/2009 |
| JP | 2009-123897 A | | 6/2009 |
| JP | 2010-50263 A | | 3/2010 |
| JP | 2012-248581 A | | 12/2012 |
| JP | 2012-253245 A | | 12/2012 |
| KR | 10-2008-0039246 A | | 5/2008 |
| WO | 2007/080852 A1 | | 7/2007 |

OTHER PUBLICATIONS

Official Communication issued in corresponding Korean Patent Application No. 10-2014-0007212, mailed on Jan. 30, 2015.
Official Communication issued in corresponding Japanese Patent Application No. 2013-230162, mailed on Dec. 15, 2015.

* cited by examiner ial electrode faces the first internal electrode in the thickness direction. The capacitor body includes a capacitance generating portion, a first outer layer portion, and a second outer layer portion. The first internal electrode and the second internal electrode are provided in the capacitance generating portion. The first outer layer portion is located between the capacitance generating portion and the first principle surface. The second outer layer portion is located between the capacitance generating portion and the second principle surface. The second outer layer portion is thicker than the first outer layer portion. At least one of a concave portion and a convex portion is provided on the second principle surface.

In a certain aspect of the multilayer capacitor according to a preferred embodiment of the present invention, no convex portion and no concave portion is provided on the first principle surface.

In another certain aspect of the multilayer capacitor according to a preferred embodiment of the present invention, the concave portion is provided on the second principle surface. The multilayer capacitor is further provided with an internal conductor. The internal conductor is provided in the second outer layer portion at a position in a region in which the concave portion is not provided when viewed from the thickness direction. The internal conductor does not substantially contribute to generation of capacitance.

In another certain aspect of the multilayer capacitor according to a preferred embodiment of the present invention, the convex portion is provided on the second principle surface. The multilayer capacitor is further provided with an internal conductor. The internal conductor is provided in the second outer layer portion at a position in a region in which the convex portion is provided when viewed from the thickness direction. The internal conductor does not substantially contribute to generation of capacitance.

In yet another certain aspect of the multilayer capacitor according to a preferred embodiment of the present invention, a plurality of internal conductors are provided along the thickness direction.

In yet another certain aspect of the multilayer capacitor according to a preferred embodiment of the present invention, the thickness dimension of the capacitor body is larger than the width dimension thereof.

A taping multilayer capacitor series according to yet another preferred embodiment of the present invention includes a multilayer capacitor according to one of the other preferred embodiments of the present invention and a carrier tape. The carrier tape includes a plurality of housing holes to house the multilayer capacitor along a length direction thereof. The multilayer capacitor is arranged in such a manner that the second principle surface faces a bottom surface of each of the housing holes.

A mounting structure of a multilayer capacitor according to a further preferred embodiment of the present invention is provided with the multilayer capacitor according to one of the other preferred embodiments of the present invention and a mounting substrate on which the multilayer capacitor is mounted. The multilayer capacitor is mounted on the mounting substrate in such a manner that the second principle surface faces the mounting substrate.

According to various preferred embodiments of the present invention, it is possible to provide a multilayer capacitor having reduced acoustic noise.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
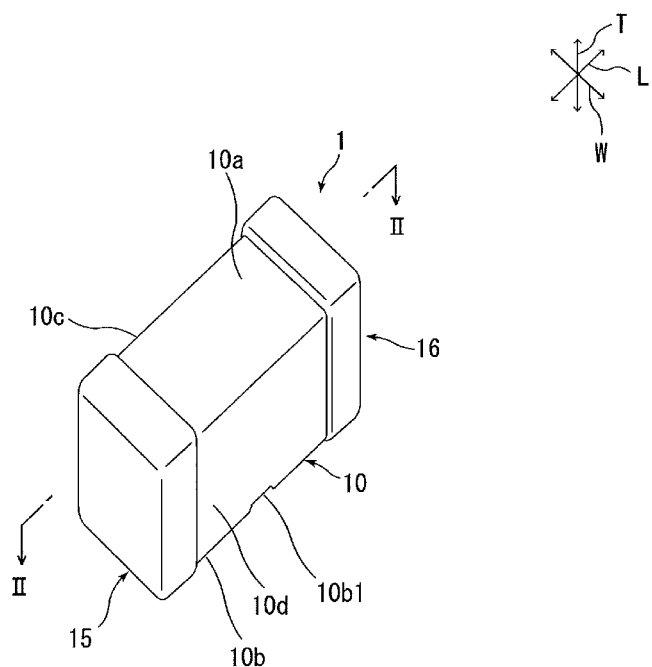
FIG. 1 is a schematic perspective view of a multilayer capacitor according to a first preferred embodiment of the present invention.

Hereinbelow, examples of preferred embodiments of the present invention will be described. However, the following preferred embodiments are merely illustrative. The present invention is not limited at all to the following preferred embodiments.

Further, in all of the drawings referenced in the preferred embodiments and the like, members having the same or substantially the same function are designated by the same reference symbols. Furthermore, the drawings referenced in the preferred embodiments and the like are schematically drawn. Therefore, the ratio in dimensions of the elements illustrated in the drawings may be different from the actual ratio thereof. In addition, also between the drawings, the ratio in dimensions of the elements may be different from each other. The ratio in dimensions of a particular element should be appropriately understood by taking the following description into consideration.

First Preferred Embodiment

Figure 2:
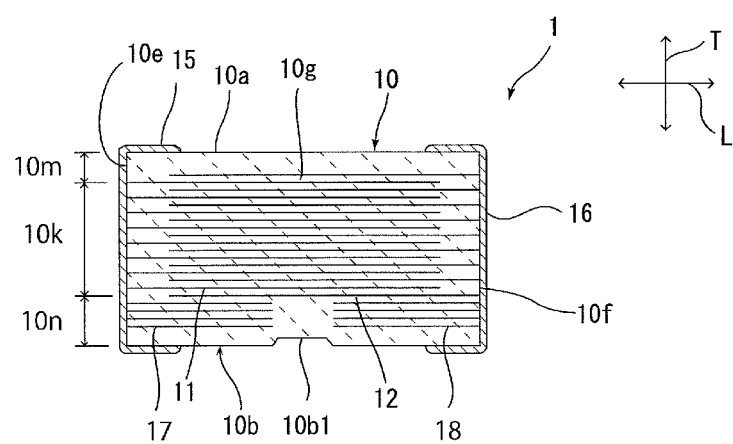
FIG. 2 is a schematic cross-sectional view taken along line II-II of FIG. 1.
Figure 3:
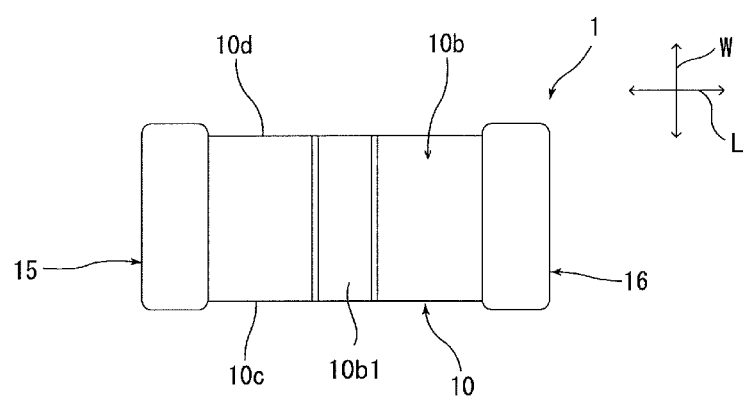
FIG. 3 is a schematic rear view of the multilayer capacitor according to the first preferred embodiment of the present invention.

FIG. 1 is a schematic perspective view of a multilayer capacitor according to the first preferred embodiment of the present invention. FIG. 2 is a schematic cross-sectional view taken along line II-II of FIG. 1. FIG. 3 is a schematic rear view of the multilayer capacitor according to the first preferred embodiment.

The multilayer capacitor 1 illustrated in FIGS. 1 to 3 is a multilayer ceramic capacitor that includes a capacitor body 10 which includes a ceramic element body. The capacitor body 10 preferably has a generally rectangular parallelepiped shape. Herein, "generally rectangular parallelepiped shape" includes a rectangular parallelepiped shape whose corners or ridge lines are rounded. The capacitor body 10 includes first and second principal surfaces 10a and 10b, first and second side surfaces 10c and 10d, and first and second end surfaces 10e and 10f. Each of the first principle surface 10a and the second principle surface 10b extends along a length direction L and a width direction W. Each of the first side surface 10c and the second side surface 10d extends along the length direction L and a thickness direction T. Each of the first end surface 10e and the second end surface 10f extends along the width direction W and the thickness direction T.

The dimension of the multilayer capacitor 1 along the length direction L is preferably about 0.6 mm to about 3.2 mm, for example. The dimension of the multilayer capacitor 1 along the width direction W is preferably about 0.3 mm to about 2.5 mm, for example. The dimension of the capacitor 1 along the thickness direction T is preferably about 0.3 mm to about 5.0 mm, for example. The dimension of the multilayer capacitor 1 along the thickness direction T is preferably larger than the dimension thereof along the width direction W.

In the present preferred embodiment, the capacitor body 10 includes, for example, dielectric ceramics mainly composed of $BaTio_3$, $CaTiO_3$, $SrTiO_3$, $CaZrO_3$ or the like. A sub-component such as a Mn compound, a Mg compound, a Si compound, a Co compound, a Ni compound, and a rare earth compound may be added to the dielectric ceramics. However, in various preferred embodiments of the present invention, the capacitor body may include a material other than dielectric ceramics such as a resin.

As illustrated in FIG. 2, a plurality of first internal electrodes 11 and a plurality of second internal electrodes 12 are provided inside the capacitor body 10. Each of the first and second internal electrodes 11 and 12 extends along the length direction L and the width direction W. Each of the first and second internal electrodes 11 and 12 is parallel or substantially parallel to the first principle surface 10a and the second principle surface 10b. The first internal electrodes 11 are arranged at intervals along the thickness direction T. Also, the second internal electrodes 12 are arranged at intervals along the thickness direction T. The first internal electrodes 11 and the second internal electrodes 12 are alternately arranged along the thickness direction T. Adjacent ones of the first and second internal electrodes 11 and 12 in the thickness direction T face each other in the thickness direction T with a dielectric portion (ceramic portion) 10g interposed therebetween. The thickness of the dielectric portion 10g is preferably about 0.5 μm to about 10 μm, for example.

Each of the first and second internal electrodes 11 and 12 can be made of, for example, Ni, Cu, Ag, Pd, an Ag—Pd alloy, or Au. The thickness of each of the first and second internal electrodes 11 and 12 is preferably about 0.3 μm to about 2 μm, for example.

The first internal electrodes 11 are not led out to the first and second side surfaces 10c and 10d and the second end surface 10f, but to the first end surface 10e. A first external electrode 15 is provided on the first end surface 10e. The first internal electrodes 11 are connected to the first external electrode 15. As illustrated in FIGS. 1 and 3, the first external electrode 15 is arranged from the first end surface 10e and across the first and second principle surfaces 10a and 10b, and the first and second side surfaces 10c and 10d.

The second internal electrodes 12 are not led out to the first and second side surfaces 10c and 10d and the first end surface 10e, but to the second end surface 10f. A second external electrode 16 is provided on the second end surface 10f. The second internal electrodes 12 are connected to the second external electrode 16. As illustrated in FIGS. 1 and 3, the second external electrode 16 is arranged from the second end surface 10f and across the first and second principle surfaces 10a and 10b, and the first and second side surfaces 10c and 10d.

Each of the first and second external electrodes 15 and 16 can be made of an appropriate conductive material. Each of the first and second external electrodes 15 and 16 may include, for example, a base layer and a plating layer provided on the base layer. The base layer can be made of, for example, Cu, Ni, Ag, Pd, an Ag—Pd alloy, or Au. Further, the base layer may contain a thermosetting resin and conductive particles. The plating layer can be made of, for example, Cu, Ni, Ag, Pd, an Ag—Pd alloy, or Au. The plating layer may include a laminate of a plurality of plating layers. The plating layer may include, for example, a laminate of a Ni plating layer and a Sn plating layer. A conductive resin layer for stress relaxation may be provided between the base layer and the plating layer.

As illustrated in FIG. 2, the capacitor body 10 includes a capacitance generating portion 10k, a first outer layer portion 10m, and a second outer layer portion 10n. The capacitance generating portion 10k is a portion of the capacitor body 10 in which the first and second internal electrodes 11 and 12 are provided, and therefore contributes to generation of capacitance. On the other hand, the first outer layer portion 10m and the second outer layer portion 10n do not include the first and second electrodes 11 and 12, and therefore do not contribute to generation of capacitance.

The first outer layer portion 10m includes a portion of the capacitor body 10 located between the capacitance generating portion 10k and the first principle surface 10a. On the other hand, the second outer layer portion 10n includes a portion of the capacitor body 10 located between the capacitance generating portion 10k and the second principle surface 10b. The second outer layer portion 10n is thicker than the first outer layer portion 10m. The thickness of the second outer layer portion 10n is preferably equal to or more than twice the thickness of the first outer layer portion 10m. The thickness of the first outer layer portion 10m is preferably about 0.03 to about 0.2 times the thickness of the capacitor body 10, for example.

The second outer layer portion 10n is provided with a plurality of first internal conductors 17 and a plurality of second internal conductors 18 both of which substantially do not contribute to generation of capacitance. Each of the first and second internal conductors 17 and 18 is arranged along the length direction L and the width direction W. Further, each of the first and second internal conductors 17 and 18 is arranged parallel or substantially parallel to the first principle surface 10a and the second principle surface 10b. The first internal conductors 17 are arranged at intervals along the thickness direction T. Also, the second internal conductors 18 are arranged at intervals along the thickness direction T.

The second outer layer portion 10n includes a portion in which the internal conductors 17 and 18 are provided (a portion between the innermost internal conductors and the outermost internal conductors) and a portion in which the internal conductors 17 and are not provided (a portion between the outermost internal conductors and the second principle surface). The portion in which the internal conductors 17 and 18 are provided is preferably thicker than the portion in which the internal conductors 17 and 18 are not provided.

The first internal conductors 17 are led out to the first end surface 10e, and connected to the first external electrode 15. The first internal conductors 17 are arranged between the center in the length direction L of the capacitor body 10 and the first end surface 10e. On the other hand, the second internal conductors 18 are led out to the second end surface 10f, and connected to the second external electrode 16. The second internal conductors 18 are arranged between the vicinity of the center in the length direction L of the capacitor body 10 and the second end surface 10f. The second outer layer portion 10n includes a region in which the first and second internal conductors 17 and 18 are not provided on the center in the length direction L thereof. Therefore, when pressing a ceramic green sheet laminate in manufacturing the capacitor body 10, a concave portion is formed on the region in which the first and second internal conductors 17 and 18 are not provided. Accordingly, the second principle surface 10b is provided with a concave portion 10b1. The internal conductors 17 and 18 are provided in the second outer layer potion 10n at positions in regions in which the concave portion 10b1 is not provided when viewed from the thickness direction T.

Figure 4:
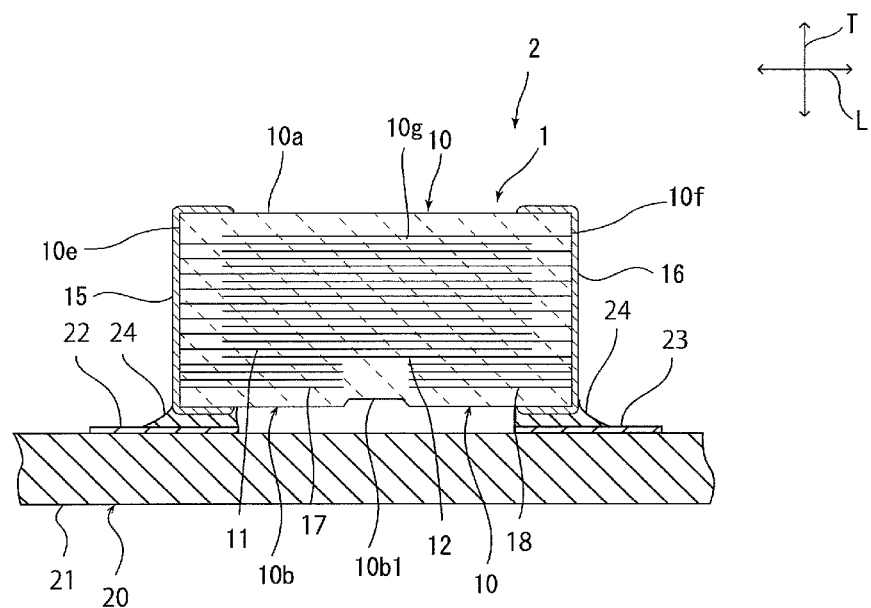
FIG. 4 is a schematic cross-sectional view of a mounting structure of the multilayer capacitor in the first preferred embodiment of the present invention.

As illustrated in FIG. 4, a distance between adjacent ones of the first internal conductors 17 which are led out to the first end surface 10e is shorter than a distance between adjacent ones of the first internal electrodes 11 which are led out to the first end surface 10e. In other words, the number of laminated first internal conductors 17 per unit length in the thickness direction T is larger than the number of laminated first internal electrodes 11 per unit length in the thickness direction T. Further, a distance between adjacent ones of the second internal conductors 18 which are led out to the second end surface 10f is shorter than a distance between adjacent ones of the second internal electrodes 12 which are led out to the second end surface 10f. In other words, the number of laminated second internal conductors 18 per unit length in the thickness direction T is larger than the number of laminated second internal electrodes 12 per unit length in the thickness direction T.

The concave portion 10b1 extends linearly from one side end in the width direction W of the capacitor body 10 up to the other side end thereof. The width of the concave portion 10b1 is preferably about 0.03 to about 0.2 times the dimension of the capacitor body 10 along the length direction L, for example. The depth of the concave portion 10b1 is preferably about 0.1 to about 0.3 times the thickness of the second outer layer portion 10n, for example.

Each of the first and second internal conductors 17 and 18 can be made of, for example, substantially the same material as that of the internal electrodes 11 and 12.

No internal conductor is provided in the first outer layer portion 10m. Therefore, substantially no convex portion and no concave portion is provided on the first outer layer portion 10m.

FIG. 4 illustrates a schematic cross-sectional view of a mounting structure 2 of the multilayer capacitor 1 in the first preferred embodiment. As illustrated in FIG. 4, the mounting structure 2 is provided with the multilayer capacitor 1 and amounting substrate 20.

The multilayer capacitor 1 is mounted on the mounting substrate 20 in such a manner that the second principle surface 10b on which the concave portion 10b1 is provided faces the mounting substrate 20. The mounting substrate 20 includes a substrate body 21. The substrate body 21 can include a ceramic substrate or a resin substrate such as a glass epoxy substrate, for example.

Lands 22 and 23 are arranged on the substrate body 21. The first external electrode 15 is electrically connected to the land 22, and the second external electrode 16 is electrically connected to the land 23. The land 22 and the land 23 are respectively bonded to the first external electrode 15 and the second external electrode 16 with a bonding material 24 which includes Sn—Pb eutectic solder, Sn—Ag—Cu solder, a conductive adhesive or the like. The bonding material 24 is also bonded to a portion of the first external electrode 15, the portion being located on the first end surface 10e, and a portion of the second external electrode 16, the portion being located on the second end surface 10f.

The bonding material 24 preferably has a height that does not reach the capacitance generating portion of the multilayer capacitor 1.

Figure 5:
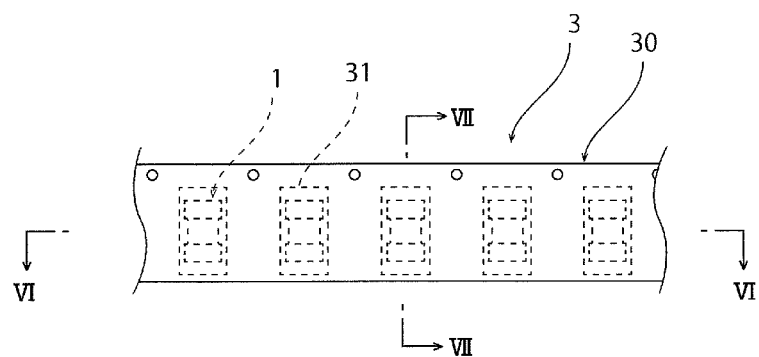
FIG. 5 is a schematic plan view of a taping multilayer capacitor series in the first preferred embodiment of the present invention.
Figure 6:
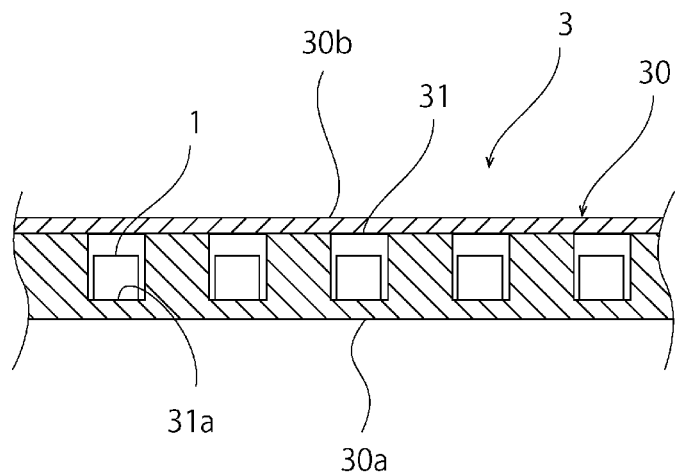
FIG. 6 is a schematic cross-sectional view taken along line VI-VI of FIG. 5.
Figure 7:
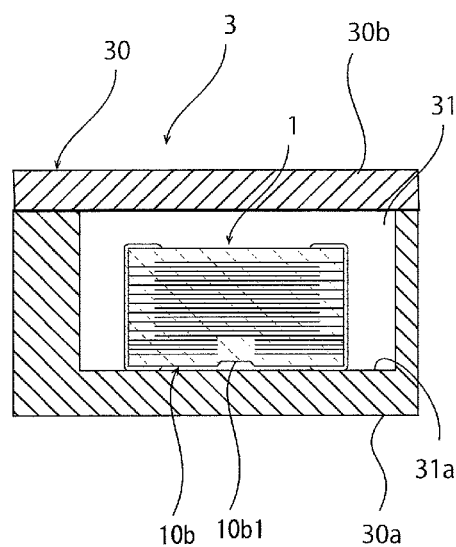
FIG. 7 is a schematic cross-sectional view taken along line VII-VII of FIG. 5.

FIGS. 5 to 7 illustrate a taping multilayer capacitor series 3. The taping multilayer capacitor series 3 includes a carrier tape 30. As illustrated in FIGS. 6 and 7, the carrier tape 30 includes a tape body 30a and a cover tape 30b. The tape body 30a includes a plurality of housing holes 31 each of which houses a multilayer capacitor 1. The housing holes 31 are arranged at intervals along the length direction of the tape body 30a. The housing holes 31 are closed by the cover tape 30b. The multilayer capacitor 1 is arranged in such a manner that the second principle surface 10b on which the concave portion 10b1 is provided faces a bottom surface 31a of the corresponding housing hole 31. Therefore, by peeling the cover tape 30b off the taping multilayer capacitor series 3 to stick-hold the first principle surface 10a which has substantially no concave portion and no convex portion, the multilayer capacitor can be easily mounted on the mounting substrate 20 with the second principle surface 10b facing the mounting substrate 20. As a result, an excellent mounting property can be achieved.

When a voltage is applied to a multilayer capacitor, a capacitance generating portion expands in the lamination direction, and, on the other hand, contracts in at least one of the length direction and the width direction. When this deformation is transmitted to a mounting substrate though external electrodes and a bonding material, the mounting substrate warps. Therefore, when an alternating-current voltage is applied to the multilayer capacitor, the mounting substrate vibrates, which may generate noise. This phenomenon of generation of noise from the mounting substrate is called "acoustic noise".

In the multilayer capacitor 1, the second outer layer portion 10n is thicker than the first outer layer portion 10m. Therefore, by mounting the multilayer capacitor 1 on the mounting substrate 20 with the thick second outer layer portion 10n facing the mounting substrate 20, a distance between the capacitance generating portion 10k and the bonding material 24 can be made long. Therefore, vibration of the multilayer capacitor 1 is not likely to be transmitted to the mounting substrate 20. As a result, acoustic noise can be effectively reduced. The technique for reducing acoustic noise by making the second outer layer portion 10n relatively thick is effective in a multilayer capacitor having a configuration that is likely to cause acoustic noise, particularly, a multilayer capacitor having a capacitance of about 10 µF or more and $\in_r$ of about 3000 or more, for example.

In view of reducing acoustic noise, both of the first outer layer portion and the second outer layer portion may be made thick. However, in this case, it is difficult to make the multilayer capacitor thin. Therefore, it is preferred that the second outer layer portion 10n be made relatively thick, and the first outer layer portion 10m be made relatively thin as in the present preferred embodiment.

However, when the second outer layer portion 10n is made relatively thick, and the first outer layer portion 10m is made relatively thin, it is necessary to identify directions when mounting the multilayer capacitor 1. In the multilayer capacitor 1, the concave portion 10b1 is preferably provided on the second principle surface 10b. Therefore, for example, by detecting the concave portion 10b1 using an optical method, a direction in the thickness direction T of the multilayer capacitor 1 is easily identified.

In view of only the direction identifying property, a concave portion or a convex portion may be provided on the first principle surface 10a. However, if a concave portion or a convex portion is provided on the relatively thin first outer layer portion 10m, the internal electrodes 11 and 12 may be affected. As a result, the insulation property may be deteriorated, or the capacitance may change. Therefore, it is preferred that the concave portion 10b1 be provided on the relatively thick second outer layer portion 10n, and no concave portion and no convex portion be provided on the first principle surface 10a.

Further, when mounting the multilayer capacitor 1 on the substrate, the first principle surface 10a is stuck to pick up the multilayer capacitor 1, and light is projected onto the second principle surface 10b. In this manner, the direction of the multilayer capacitor 1 is recognized, and, at the same time, the second outer layer portion 10n of the multilayer capacitor 1 can be confirmed to be a mounting surface.

In view of further improving the direction identifying property, the concave portion 10b1 preferably includes an inclined surface that is inclined relative to a region in which the concave portion 10b1 is not provided in the principle surface 10b. The projected light is reflected in different directions by the inclined surface and a region other than the inclined surface. Therefore, when the concave portion 10b1 includes the inclined surface, an image taken by a camera has a large difference in the density thereof. When the image has a large difference in the density thereof, the image can be easily binarized, and it is therefore easy to identify directions. In the present preferred embodiment, as illustrated in FIG. 3, two inclined surfaces in total are provided on the respective ends in the length direction of the concave portion 10b1. When a plurality of inclined surfaces are provided in this manner, it is more easy to identify directions. The concave portion 10b1 is preferably arranged to extend from the first side surface 10c up to the second side surface 10d. In this case, even when viewed from the side surface, the concave portion 10b1 can be detected. However, the concave portion 10b1 may also be provided only in a portion of the second principle surface 10b in the width direction W.

In order to easily provide the inclined surface, the internal conductors 17 and 18 are preferably laminated by slightly shifting their positions. That is, a region in which the positions of the internal conductors 17 and 18 are shifted is made thinner than the region in which the internal conductors 17 and 18 are laminated, and thicker than the region in which the internal conductors 17 and 18 are not laminated. Therefore, when the capacitor body 10 is press-formed, a portion from the region in which the internal conductors 17 and 18 are laminated through the region in which the internal conductors 17 and 18 are not laminated is easily formed into the inclined surface.

When the concave portion 10b1 and the inclined surface are formed using the internal conductors 17 and 18 as in the present preferred embodiment, the positional accuracy of the concave portion 10b1 and the inclined surface in the second principle surface 10b is higher than that in the second preferred embodiment which will be described later. Therefore, it is easy to perform image recognition and image processing when identifying directions.

Hereinbelow, another example of one of the preferred embodiments of the present invention will be described. In the following description, members having the same or substantially the same functions as those of the first preferred embodiment will be referenced by the common reference symbols, and a description thereof will be omitted.

Second Preferred Embodiment

Figure 8:
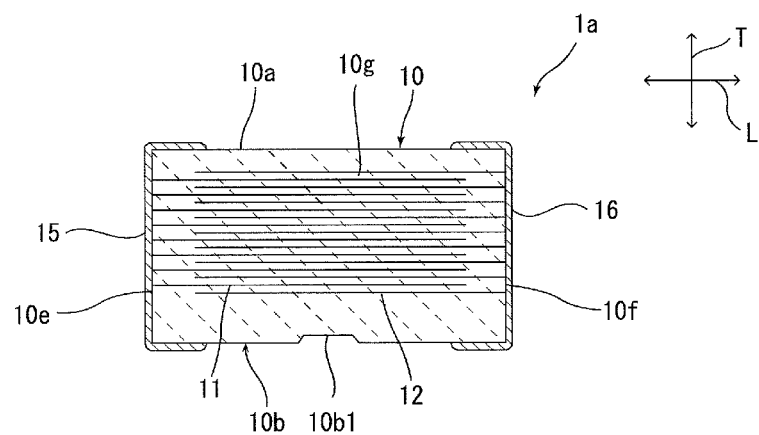
FIG. 8 is a schematic cross-sectional view of a multilayer capacitor according to a second preferred embodiment of the present invention.

FIG. 8 is a schematic cross-sectional view of a multilayer capacitor 1a according to the second preferred embodiment of the present invention. No internal conductor may be provided in a second outer layer portion 10n as in the multilayer capacitor 1a. In this case, a concave portion 10b1 may be press-formed using a forming die having a convex portion. In this case, an inclined surface can be formed by adjusting pressing conditions. Further, when the convex portion of the forming die has an inclined surface portion that is inclined relative to a region in which the convex portion is not formed in the forming die, the inclined surface can be more easily formed. However, when performing the press using the forming die having the convex portion, internal electrodes 11 and 12 are likely to be deformed. Therefore, it is preferred to provide the concave portion 10b1 by providing internal conductors 17 and 18 in the same manner as in the first preferred embodiment.

Third Preferred Embodiment

Figure 9:
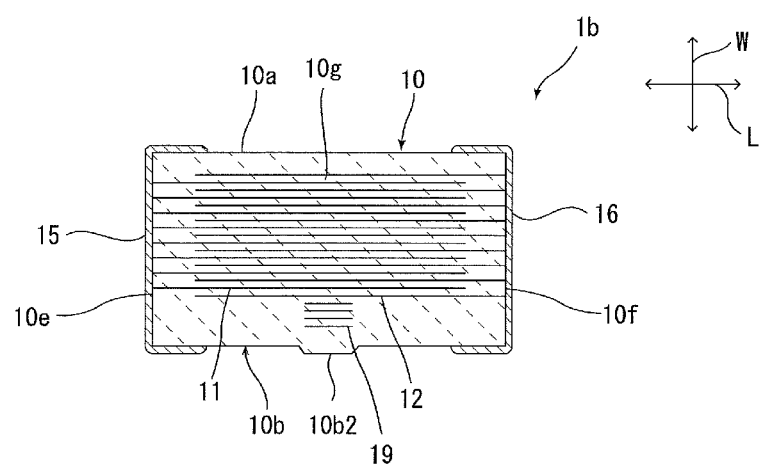
FIG. 9 is a schematic cross-sectional view of a multilayer capacitor according to a third preferred embodiment of the present invention.

FIG. 9 is a schematic cross-sectional view of a multilayer capacitor 1b according to the third preferred embodiment of the present invention. In the multilayer capacitor 1b, a plurality of internal conductors 19 are provided on the center in the length direction L of a second outer layer portion 10n along the thickness direction T. Accordingly, a convex portion 10b2 is provided on a second principle surface 10b. When viewed from the thickness direction T, the internal conductors 19 are located in the second outer layer portion 10n at positions in the region in which the convex portion 10b2 is provided. Also in the present preferred embodiment, in the same manner as in the first preferred embodiment, the convex portion 10b2 preferably includes an inclined surface that is inclined relative to a region in which the convex portion 10b2 is not provided in the second principle surface 10b. A preferred shape and a preferred forming method of the inclined surface are the same as those of the first preferred embodiment. Further, in the present preferred embodiment, the positional accuracy of the convex portion 10b2 and the inclined surface in the second principle surface 10b is higher than that of the second preferred embodiment as in the first preferred embodiment.

Also in the multilayer capacitor 1b, acoustic noise is significantly reduced as in the first preferred embodiment. Further, it is possible to achieve an excellent direction identifying property along the thickness direction T of the multilayer capacitor 1b.

In the first preferred embodiment and the second preferred embodiment, there have been described the examples in which the concave portion 10b1 is preferably provided on the second principle surface 10b. Further, in the third preferred embodiment, there has been described the example in which the convex portion 10b2 is preferably provided on the second principle surface 10b. However, the present invention is not limited to these configurations. For example, both of the concave portion and the convex portion may be provided on the second principle surface.

Hereinbelow, preferred embodiments of the present invention will be further described in detail on the basis of a specific non-limiting example thereof. However, the present invention is not limited at all to the following example, and can be carried out with an appropriate change without changing the gist of the invention.

Example

Figure 10:
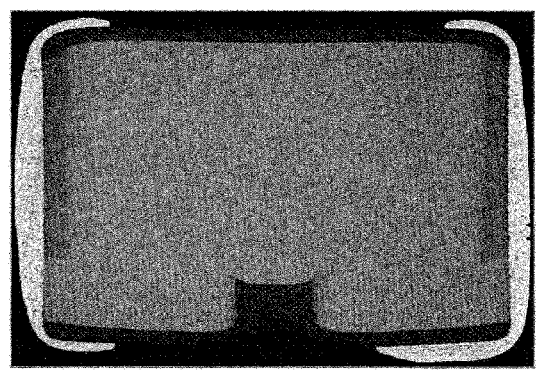
FIG. 10 is a photograph of the cross section of a multilayer capacitor manufactured in an example.

A plurality of multilayer capacitors each of which is substantially the same as the multilayer capacitor 1 according to the first preferred embodiment were manufactured under the following conditions. FIG. 10 illustrates a photograph of the cross section of the multilayer capacitor manufactured in the example.

Length dimension of multilayer capacitor: approximately 1.7 mm

Width dimension of multilayer capacitor: approximately 0.9

Number of internal electrodes: approximately 500

Number of dielectric layers: approximately 500

Thickness of capacitance generating portion: approximately 760 μm

Distance between end of first internal electrode and second end surface (=distance between end of second internal electrode and first end face): approximately 85 μm Capacitance: 22 μF Thickness of first outer layer portion: approximately 50 μm Thickness of second outer layer portion: approximately 250 μm Thickness of region having internal conductors: approximately 200 μm Number of internal conductors: approximately 130

Thickness of region having no internal conductor in second outer layer portion: approximately 50 μm Gap between internal conductors in length direction: approximately 170 μm Thickness dimension of multilayer capacitor: approximately 1.1 mm Thickness of part of external electrode on each principle surface: approximately 20 μm Depth of concave portion: approximately 50 μm

Comparative Example

A plurality of multilayer capacitors were manufactured in substantially the same manner as in the above example excepting the following conditions.

Thickness of second outer layer portion: approximately 50 μm Internal conductor: N/A Thickness dimension of multilayer capacitor: approximately 0.9 μm Depth of concave portion: N/A Note that the thicknesses and the width of the concave portion in each of the example and the comparative example are design values after firing. However, when the manufactured multilayer capacitor was polished from the side surface thereof, then, in the cross section on the center in the width direction of the multilayer capacitor, each of the thicknesses on the center in the length direction and the depth on the center in the length direction of the concave portion were measured, and average values in three samples were then calculated, the calculated average values were confirmed to be substantially equal to the design values.

While light was being directed to each of the multilayer capacitors manufactured in the example and the comparative example from underneath thereof, the second principle surface of each of the multilayer capacitors was imaged. In the example in which the concave portion was provided, a reflected state of light in a region having the concave portion was different from the other region, it was possible to identify directions. On the other hand, in the comparative example in which no concave portion was formed on the second principle surface, it was not possible to identify directions.

Each of the multilayer capacitors manufactured in the example and the comparative example was polished from the side surface thereof, and the cross section on the center in the width direction of each of the multilayer capacitors was observed using an electron microscope to confirm presence/absence of the structural defect of the internal electrodes. As a result, no structural defect of the internal electrodes was confirmed in both of the example and the comparative example.

Figure 11:
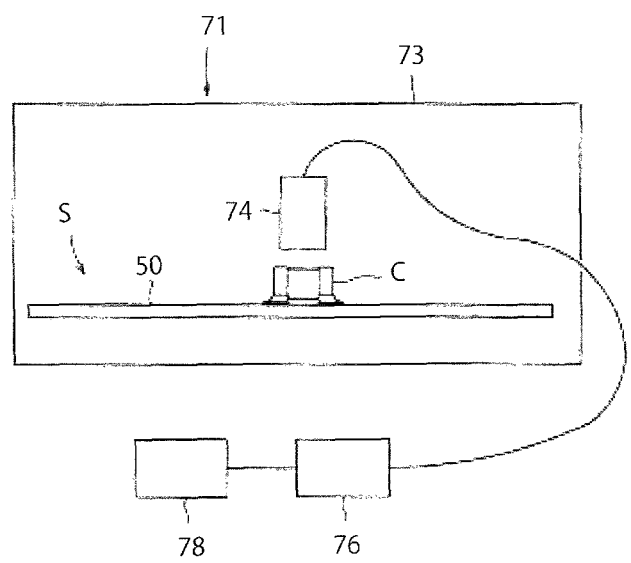
FIG. 11 is a schematic side view for explaining a method for measuring the sound pressure of acoustic noise.

As illustrated in FIG. 11, three multilayer capacitors C manufactured in each of the example and the comparative example were used, and each of the multilayer capacitors was mounted on a mounting substrate 50 using solder to produce a sample S. Then, the sample S was placed inside an anechoic box 73 of a measurement apparatus 71, and a 1 Vpp alternating-current voltage having a frequency of 500 Hz was applied to the multilayer capacitor C. In this state, acoustic noise was collected using a sound collection microphone 74 arranged 3 mm above the multilayer capacitor C of the sample S. Then, a sound pressure level of the collected acoustic noise was measured using a sound collection meter 76 and a FFT analyzer 78 (manufactured by ONO SOKKI CO, LTD., CF-5220), and an average value in three samples S was calculated in each of the example and the comparative example. As a result, the sound pressure level of the measured acoustic noise was as follows.

Example: 26 dB
Comparative Example: 68 dB

This is because of that, in the example, the multilayer capacitor in which the second outer layer portion is thicker than the first outer layer portion is mounted on the mounting substrate using the bonding material with the second outer layer portion 10n facing the mounting substrate, thus making it possible to increase the distance between the capacitance generating portion and the bonding material. Further, by providing the first and second internal conductors in the second outer layer portion, the second outer layer portion is made rigid. Furthermore, by laminating the first and second internal conductors in such a manner that the number of laminated first and second internal conductors is larger than the number of laminated first and second internal electrodes per unit length in the thickness direction T, the second outer layer portion is made more rigid. Accordingly, it would appear that the rigid second outer layer portion restricts deformation of the multilayer capacitor, which also contributes to the above result.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A multilayer capacitor comprising:
   a capacitor body including first and second principle surfaces extending along a length direction and a width direction, first and second side surfaces extending along the length direction and a thickness direction, and first and second end surfaces extending along the width direction and the thickness direction;
   a first internal electrode provided inside the capacitor body; and
   a second internal electrode provided inside the capacitor body, the second internal electrode facing the first electrode in the thickness direction; wherein
   the capacitor body includes:
      a capacitance generating portion in which the first internal electrode and the second internal electrode are provided;
      a first outer layer portion located between the capacitance generating portion and the first principle surface; and
      a second outer layer portion located between the capacitance generating portion and the second principle surface;
   the second outer layer portion is thicker than the first outer layer portion;
   only one concave portion is provided on the second principle surface;
   no convex portion and no concave portion is provided on the first principle surface;
   a width of the concave portion is about 0.03 to about 0.2 times a dimension of the capacitor body along the length direction; and
   the concave portion is not filled with any material and is exposed to an exterior of the multilayer capacitor.

2. The multilayer capacitor according to claim 1, further comprising at least one internal conductor, wherein
   the at least one internal conductor is provided in the second outer layer portion at a position in a region in which the concave portion is not provided when viewed from the thickness direction and does not substantially contribute to generation of capacitance.

3. The multilayer capacitor according to claim 2, wherein the at least one internal conductor includes a plurality of internal conductors provided along the thickness direction.

4. The multilayer capacitor according to claim 2, wherein the at least one internal conductor includes a plurality of internal conductors provided along the thickness direction.

5. The multilayer capacitor according to claim 1, wherein a thickness dimension of the capacitor body is larger than a width dimension thereof.

6. The multilayer capacitor according to claim 1, wherein the first outer layer portion and the second outer layer portion do not include any internal conductors that contribute to generation of capacitance.

7. The multilayer capacitor according to claim 1, wherein the concave portion includes an inclined surface.

8. A taping multilayer capacitor series comprising:
   the multilayer capacitor according to claim 1; and
   a carrier tape including a housing hole to house the multilayer capacitor; wherein
   the multilayer capacitor is arranged such that the second principle surface faces a bottom surface of the housing hole.

9. The taping multilayer capacitor series according to claim 8, further comprising a plurality of the multilayer capacitor, wherein the carrier tape includes a plurality of housing holes, each of which is configured to house one of the multilayer capacitors.

10. A mounting structure of a multilayer capacitor comprising:
    the multilayer capacitor according to claim 1; and
    a mounting substrate on which the multilayer capacitor is mounted; wherein
    the multilayer capacitor is mounted on the mounting substrate such that the second principle surface faces the mounting substrate.

11. The mounting structure according to claim 10, wherein the mounting substrate includes a substrate body made of a ceramic or resin, and lands provided on a surface of the substrate body.

12. The mounting structure according to claim 11, wherein a bonding material is provided to connect the lands to external electrodes of the multilayer capacitor such that the bonding material has a height that does not reach the capacitance generating portion of the multilayer capacitor.

13. A multilayer capacitor comprising:
a capacitor body including first and second principle surfaces extending along a length direction and a width direction, first and second side surfaces extending along the length direction and a thickness direction, and first and second end surfaces extending along the width direction and the thickness direction;
a first internal electrode provided inside the capacitor body; and
a second internal electrode provided inside the capacitor body, the second internal electrode facing the first electrode in the thickness direction; wherein
the capacitor body includes:
  a capacitance generating portion in which the first internal electrode and the second internal electrode are provided;
  a first outer layer portion located between the capacitance generating portion and the first principle surface; and
  a second outer layer portion located between the capacitance generating portion and the second principle surface;
the second outer layer portion is thicker than the first outer layer portion;
only one concave portion is provided on the second principle surface;
no convex portion and no concave portion is provided on the first principle surface;
a depth of the concave portion is about 0.1 to about 0.3 times a thickness of the second outer layer portion; and
the concave portion is not filled with any material and is exposed to an exterior of the multilayer capacitor.

14. The multilayer capacitor according to claim 13, further comprising at least one internal conductor, wherein
the at least one internal conductor is provided in the second outer layer portion at a position in a region in which the concave portion is not provided when viewed from the thickness direction and does not substantially contribute to generation of capacitance.

15. A taping multilayer capacitor series comprising:
the multilayer capacitor according to claim 13; and
a carrier tape including a housing hole to house the multilayer capacitor; wherein
the multilayer capacitor is arranged such that the second principle surface faces a bottom surface of the housing hole.

16. A mounting structure of a multilayer capacitor comprising:
the multilayer capacitor according to claim 13; and
a mounting substrate on which the multilayer capacitor is mounted; wherein
the multilayer capacitor is mounted on the mounting substrate such that the second principle surface faces the mounting substrate.

* * * * *